United States Patent Office.

CAMPBELL MORFIT, OF SUDBROOK PARK, ENGLAND.

Letters Patent No. 111,370, dated January 31, 1871.

IMPROVEMENT IN THE MANUFACTURE OF SUPERPHOSPHATE OF LIME.

The Schedule referred to in these Letters Patent and making part of the same.

*To all whom it may concern:*

Be it known that I, CAMPBELL MORFIT, chemist, of the city of Baltimore, in the State of Maryland and United States of America, but now at Sudbrook Park, county of Surrey, England, have invented a new and Improved Method for Making Superphosphate of Lime; and I do hereby declare that the following is a full and exact description thereof.

My invention consists in the chemical treatment of animal or mineral phosphates of lime, without regard to the amount of carbonate of lime which they may contain, for their conversion into bi-phosphate of lime, either pure or associated with sulphate of lime and ammonium or potassium chlorides.

To carry out my invention practically, a vat of wood or stone, fitted with a stirrer, is to be provided, and charged with commercial hydrochloric acid of specific gravity 1.170, to the extent of two pounds for every per cent. of carbonate of lime which the crude phosphate may contain, assuming that South Carolina phosphate or coprolites are to be operated upon, and that they contain, respectively, twelve per cent. of carbonate of lime and fifty-five per cent. of tri-phosphate of lime, or thereabout; then, for every ton of either one of those raw materials, there will be required five hundred weight of hydrochloric acid of specific gravity 1.170.

The crude phosphate must be in fine powder and allowed to fall into the acid very gradually from a hopper during constant stirring.

As the mass thickens it is to be diluted with hot or cold water from time to time.

When all the crude mineral has been added and stirred into a complete mixture, the whole is to be left at repose for eight or ten hours. At the end of that period all or nearly all of the carbonate of lime will have been decomposed and dissolved into chloride of calcium.

This solution of chloride of calcium is now to be allowed to drain off into a separate vat, after which the solid residue is to be washed with several relays of water and the wash-waters mixed with the previous strong liquor.

The united liquors in the separate vat are to be treated apart, as will be explained directly.

To the solid residue in the first vat brown oil of vitriol of specific gravity 1.700 is to be added in a very thin stream.

Every per cent. of bone or tri-phosphate of lime will require, say, 0.80 of brown oil of vitrol.

In round numbers, each ton of crude phosphate of lime will need nine to nine and a half hundredweight of this acid.

After about eighteen hours, during which interval the mass is to be roused by stirring for ten to fifteen minutes every hour, the whole of the phosphate of lime will have become converted into bi-phosphate and sulphate of lime.

The action of the hydrochloric acid preliminary to that of the sulphuric acid and its dilute state keeps down the proportion of fluoride of calcium and oxides and phosphates of aluminum and iron, which otherwise might be dissolved.

Moreover, the use of hydrochloric acid in this manner gives the advantage of introducing, subsequently, chloride of ammonium or potassium, by chemical interaction, into the fertilizer, thus increasing the potency and profit of the latter, and correcting at the same time all tendency to humidity, which the presence of chloride of calcium would promote.

If only an ordinary commercial superphosphate of high strength is required, then the sand and other insoluble matters of the crude phosphate material may be allowed to remain in the fertilizer and the whole dried for market.

But should it be required to make pure bi-phosphate of lime free from sulphate and carbonate of lime, sand, and other insoluble matters, the mass, after being freed from the chloride of calcium liquor and treated with brown oil of vitriol, as above, is to be thinned with warm water, well stirred, and then put into draining-boxes.

Here the contained liquor, holding in solution bi-phosphate of lime with traces of sulphate, is allowed to drain off, after which fresh relays of water are to be poured on several times, until all the bi-phosphate of lime has been displaced from the nearly insoluble sulphate of lime.

The first liquor passing through together with the subsequent wash-waters is to be united and evaporated in a properly-constructed pan or kiln to as great a density as possible.

At this stage sufficient of finely-powdered mineral phosphate of lime to dry the whole is to be added, and when the well-stirred mass has become cool it is to be dashed into a fine powder by a Howel or other mill.

The residual sulphate of lime and other matters in the draining-boxes will be a most excellent mixing-material for low grades of fertilizers, after it may have been dried in air-currents or a moderately-heated apartment.

To economize the hydrochloric acid employed in the preliminary treatment of the crude phosphate the liquor and wash-waters which were reserved in a separate vat are now to be treated with a dense aqueous solution of either sulphate of ammonia or sulphate of potassa, during constant stirring until a precipitate ceases to be produced.

The chloride of calcium formed from the carbonate of lime is thus converted into chloride of ammonium or chloride of potassium, while sulphate of lime results simultaneously, there being a double exchange of bases between the two salts in this reaction.

The choice of the ammonia or potassa sulphate must depend upon the application for which the fertilizer may be intended.

The two salts may be even employed together for the same product, in half portions consecutively, so as to produce a mixture of ammonium and potassium chlorides when a compound fertilizer is required.

Crude ammoniacal liquor or "pearlash" may be substituted for the sulphates, and in manner as just explained; but in such cases the lime salt produced would be carbonate insead of sulphate.

The alkaline liquor, or rather solution of ammonium or potassium chloride, is to be drawn off from the precipitated sulphate or carbonate of lime, as the case may be, evaporated to dryness, and mixed with the bi-phosphate of lime as previouly dried, or sent into market separately.

Claim.

What I claim is—

Hydrochloric acid, sulphuric acid, sulphate of ammonia or crude ammoniacal liquor, and sulphate or carbonate of potassa, in the treatment of bones, bone-ash, bone-black, phosphorite, apatite, cooperite or "Navaza guano," "Sombrero guano," South Carolina phosphate, coprolites, and the mineral phosphates of lime generally, for the economical production of bi-phosphate of lime in a concentrated form, either with or without the association of ammonia or potassa salts, after the manner and by the means as herein substantially set forth and described.

In witness whereof I have hereunto set my hand and seal this twenty-fourth day of August, in the year of our Lord one thousand eight hundred and seventy.

CAMPBELL MORFIT. [L. S.]

Witnesses:
T. W. FRIGORT,
F. W. ATKINSON.